United States Patent [19]

Wayson et al.

[11] 3,955,856

[45] May 11, 1976

[54] ANTI-FRICTION DEVICE

[75] Inventors: Andrew J. Wayson, Needham; James Moy, Norwell, both of Mass.

[73] Assignee: Litton Industrial Products, Inc., Hingham, Mass.

[22] Filed: Mar. 5, 1975

[21] Appl. No.: 555,580

[52] U.S. Cl. .............................. 308/3 R; 308/238; 308/DIG. 7
[51] Int. Cl.² ........................................ F16C 17/00
[58] Field of Search ........ 308/2 R, 3 R, 5 R, 237 R, 308/238, 240, DIG. 7; 14/16; 252/12.4, 13

[56] References Cited
UNITED STATES PATENTS

| | | | |
|---|---|---|---|
| 3,376,082 | 4/1968 | Soder | 308/3 R |
| 3,380,843 | 4/1968 | Davis | 308/240 X |
| 3,711,166 | 1/1973 | Wayson | 308/3 R |

*Primary Examiner*—M. H. Wood, Jr.
*Assistant Examiner*—Gene A. Church
*Attorney, Agent, or Firm*—Arthur Gershman

[57] ABSTRACT

An antifriction device for use under hostile conditions such as high temperature or nuclear radiation environments or for use under sustained impact loading. The device comprises two components: first, a fibrous, non-metallic substrate which is capable of withstanding hostile conditions such as high temperatures, high nuclear radiation or sustained impact loading, and second, a lubricating medium carried by and substantially permeating the entire fibrous substrate. When the device is disposed between two members, the members will be capable of moving relative to one another due to the relatively low coefficient of sliding or rolling friction at a surface between the members.

20 Claims, 6 Drawing Figures

U.S. Patent   May 11, 1976   3,955,856
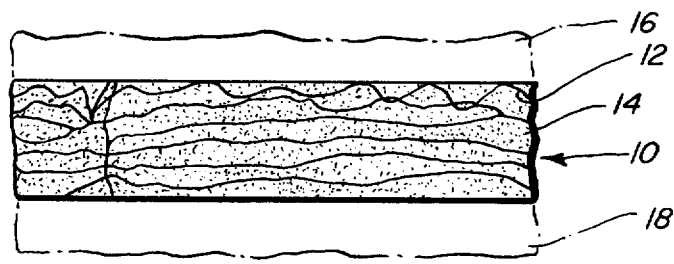
Fig_1
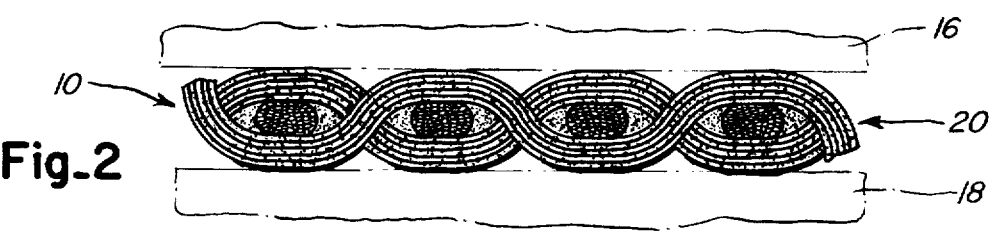
Fig_2
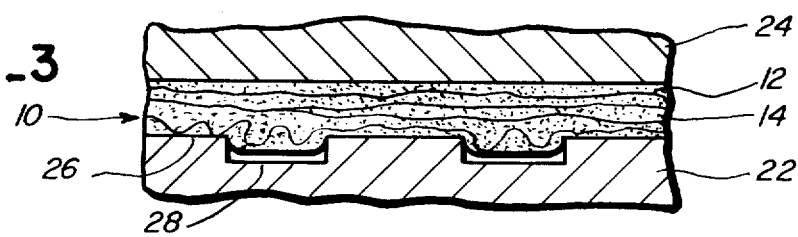
Fig_3
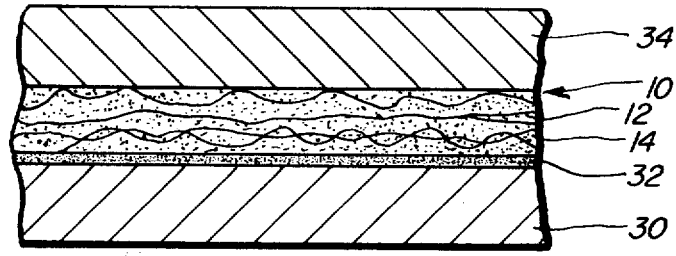
Fig_4
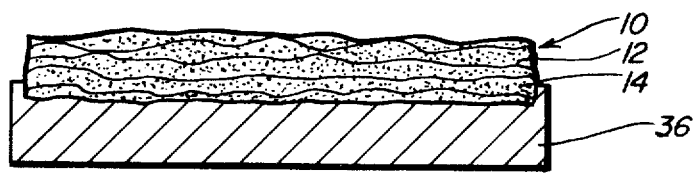
Fig_5
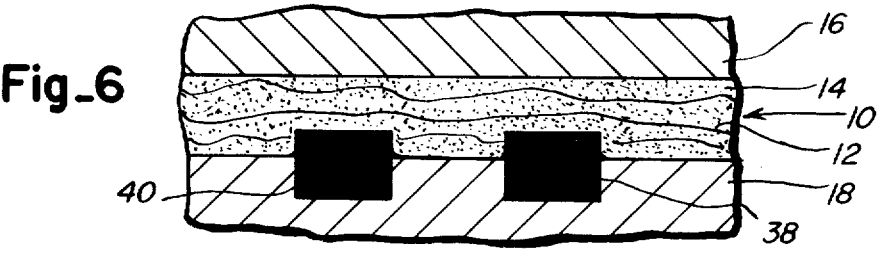
Fig_6

3,955,856

ANTI-FRICTION DEVICE

BACKGROUND

This invention relates to an anti-friction device for use under hostile conditions, such as in high temperature or high nuclear radiation environments, or under sustained impact loading.

The use of a fabricated polymeric material for an anti-friction device, (commonly called a bearing) has recently become known, as shown by U.S. Pat. No. 3,711,166, to Wayson. In this patent, a fabricated sheet of TFE-fluorocarbon fibers by the du Pont Company (sold under the trademark "Teflon") or other material of similar characteristics is used as an element in an anti-friction device to reduce the coefficient of sliding or rolling friction at a surface between two structural members. This device is used where relatively heavy load bearing members must be permitted to move relative to one another. For example, in a bridge or a hydroelectric power generator, the members of the structure develop considerable stresses through temperature and weather variations and the application of dead and live loads. To relieve these member stresses, bearings are positioned at strategic positions between the members. These bearings allow the members to move relative to one another at low speeds due to the relatively low coefficient of sliding or rolling friction at a surface, thereby relieving stresses.

While the anti-friction device of U.S. Pat. No. 3,711,166 has been found to perform excellently for its intended purpose, its use for certain other applications has been limited. Thus, where the anti-friction device is exposed to high temperatures or to high levels of nuclear radiation or to sustained impact loading or some combination of these, degradation of the material of the device will have adverse effects on its anti-friction properties.

Similarly, if other known bearings are exposed to these hostile environments or loading conditions, they will be destroyed by this exposure. Some examples of these special applications where such hostile conditions exist are as follows: between electrostatic precipitators and their supports; between condensors and their supports; between pipes and structural components and their supports in nuclear power installations and other hostile environments; in structures in marine environments; in couplings between a truck cab and its rig, or between subway cars, or other uses where sustained impact loads are applied; and, between a piston and its surrounding cylinder in a high temperature or nuclear radiation environment. Thus, a need exists for an anti-friction device which is capable of withstanding hostile environments or loading conditions.

DEFINITIONS

When the term "hostile conditions" is used in the specification or appended claims, the term is intended to include the following conditions: (1) high temperature environments, (2) high nuclear radiation environments, (3) sustained impact loading. These conditions may exist either independently of each other or in combination with one another.

When the term "high temperature" is used in the specification or appended claims, the term is intended to mean temperatures greater than 425°F.

When the term "high levels of nuclear radiation" is used in the specification or appended claims, it is intended to describe those levels above ambient levels of nuclear radiation which are normally found in components associated with a nuclear fueled power generator or other industrial installations associated with a source of nuclear energy. It is to be noted that this does not extend to those levels of radiation found in the reactor core itself, but to those levels found in pipes which carry nuclear material, supporting structures outside the core, etc.

SUMMARY

The present invention of an anti-friction device has two essential components: first, a fibrous, non-metallic substrate which is capable of withstanding adverse environments or conditions, such as high temperatures, nuclear radiation or sustained impact loading, and second, a lubricating medium carried by and substantially permeating the entire fibrous substrate so that when the device is disposed at the surface between two members, the members will be capable of moving relative to one another due to the relatively low coefficient of sliding friction at a surface between the members.

BRIEF DESCRIPTION OF THE DRAWING

FIG. 1 is a cross-sectional view of the anti-friction device of the invention showing the components of the device, with the device positioned between the surfaces of two members shown in phantom lines.

FIG. 2 is a cross-sectional view of the anti-friction device in which the fibrous substrate is woven.

FIG. 3 is a cross-sectional view of the anti-friction device of the invention, mechanically bonded to one of the members.

FIG. 4 is a cross-sectional view of the anti-friction device of the invention, adhesively bonded to the surface of one of the members.

FIG. 5 is a cross-sectional view of the anti-friction device of the invention wherein one of the members is cast in place around the anti-friction device, thereby bonding the member to the anti-friction device.

FIG. 6 is a cross-sectional view of the anti-friction device of the invention provided with an additional source of lubricant.

DETAILED DESCRIPTION

FIG. 1 shows an anti-friction device 10 in accordance with the invention. The device comprises two components: first, a fibrous, non-metallic substrate 12, and second, a lubricating medium 14 carried by fibrous substrate 12 and permeating substantially the entire substrate.

The fibrous, non-metallic substrate 12 is made from a material having high tensile and tear strength, high impact resistance and which is resistant to high temperatures. The material is capable of absorbing the lubricating medium in the interstices of the fibrous material of the substrate, so that the entire substrate is saturated with the lubricating medium. Thus, the fibrous substrate absorbs a large quantity of lubricating medium, creating a reservoir of lubricant within the substrate. Additionally, the material may be resistant to high levels of nuclear radiation.

One material which has been found useful as a substrate for the anti-friction device of the invention is an organic polymeric compound of the type known as an aromatic polyamide, generically known as an aramid. An example of such a material is "Kevlar" 29 DP-01 (trademark of du Pont Corp. which is a temporary designation assigned by the FTC pending action on an application for a new generic name.). This material and similar materials are described in U.S. patents owned by the du Pont Corp. and in Dupont technical manual A-95059. Kevlar 29 DP-01 has the following properties:

| | |
|---|---|
| Density | 1.44 gm/cc |
| Filament diam. | 0.00047 in. |
| Denier per fil. | 1.5 |
| Break elongation | 3–4% |
| Tensile strength | 400,000 psi |
| Modulus | $9 \times 10^5$ psi |
| Melting point | does not melt, chars at 800°F |

This material has been proven to have useful characteristics as a substrate for an anti-friction device at temperatures greater than 425°F (the transformation temperature of "Teflon" TFE). The material is resistant to high levels of radiation. In addition, this material is a fibrous, non-metallic material which is capable of withstanding heavy static loads or sustained impact loading. The material may be fabricated in a number of ways and woven into a mat which will readily carry and hold a liquid or a solid particulate suspension. The lubricating medium, which is absorbed by the material of the substrate, thus substantially permeates throughout the entire substrate providing a reservoir of lubricant throughout the mat. An embodiment of the invention in which the fibrous substrate is woven into a mat 20 is shown in FIG. 2. The invention is not limited to the use of this material for a substrate, however. Any material which has equivalent or similar properties may be used.

The second component of the anti-friction device of the invention, lubricating medium 14, may be made of a variety of lubricating materials, and may take a variety of physical forms. Some examples of lubricating materials suitable for lubricating medium 14 are graphite, silicon, "Teflon", greases and molybdenum disulfide. In order that anti-friction device 10 forms a surface providing a relatively low coefficient of sliding friction, thus permitting relative movement between the two members, lubricating medium 14 must permeate substantially throughout substrate 12. The lubricating medium is absorbed by the material of substrate 12, and penetrates throughout the fibers of the material of the substrate. The substrate 12 will thus be saturated with lubricating medium 14 forming a reservoir of the lubricating medium and providing an anti-friction surface having a low coefficient of sliding friction when a load is applied thereto. Substrate 12 may be impregnated with lubricating medium 14 in a variety of ways. If lubricating medium 14 is in liquid form, it may be applied directly to substrate 12, as by soaking, brushing, spraying or dipping. If lubricating medium 14 is in solid form, lubricating medium 14 may be powdered and then either applied directly to the substrate or placed into solution or into a solid suspension and then applied to the substrate and cured.

Additionally, a filler may be added to lubricating medium 14 to give body to the lubricant or to increase its ductility. A filler which may typically be used is lead.

The anti-friction device 10 as thus described is adapted to be disposed between the surfaces of two members 16 and 18, as shown in FIGS. 1 and 2, which may be, for example, a pipe and its supporting structure or an electrostatic precipitator and its supporting structure. When stresses are generated in the members 16 and 18 due to thermal expansion, environmental effects, or to the application of dead or live loads, the device 10 provides an interface between members 16 and 18 having a relatively low coefficient of sliding and rolling friction, which permit the members to move relative to one another, thereby relieving stresses in the members and the surrounding structures.

FIG. 3 shows an additional embodiment of the invention. The anti-friction device 10 of FIG. 3 is rigidly mechanically bonded to plate 22, similar to the device described in U.S. Pat. No. 3,711,166. This embodiment would typically be used where plate 22 supports a heavy structural member, such as a large tank, pipe or beam. Plate 22 is provided with raised portions 26 providing raised areas and lowered portions 28 providing lowered areas. Substrate 12 is disposed between plate 22 and the member 24. When the load is applied to plate 22 and member 24, the load will be supported on the raised portions 26 of plate 22 against which substrate 12 is compressed. A portion of the fibrous substrate will be forced into the lowered portions 28 of plate 22. The co-action of the raised portions 26 of substrate 12 and the portions of substrate 12 that are below the level of the raised areas of plate 22 will anchor the substrate against lateral movement on plate 22. Member 24 is thus capable of moving relative to substrate 12 and plate 22 with a relatively low coefficient of friction. The raised and lowered portions 26 and 28 may take a variety of shapes and forms. In addition, plate 22 may take on a variety of contours so as to provide an anti-friction device. Some of the many forms which plate 22 may take are shown in U.S. Pat. No. 3,711,166, in FIGS. 1–12 and FIGS. 14–21. The embodiment of FIG. 3 may be used either with or without an adhesive between substrate 12 and plate 22.

In the embodiment of FIG. 4 the anti-friction device 10 is rigidly adhesively secured to plate 30 by adhesive 32. Adhesive 32 may be any of a number of commercially available adhesives which are chemically compatable with lubricating medium 14, such as an epoxy resin. Preferably, in the embodiment of FIG. 4, substrate 12 is first adhesively bonded by adhesive 32 to plate 30. Then substrate 12 is impregnated with lubricating medium 14, in one of a number of ways, such as by dipping, spraying, brushing, etc., as previously described. The anti-friction device 10 is then disposed between member 34 and a support for plate 30 (not shown). Member 34 is thus capable of moving relative to substrate 12 and plate 30 due to the relatively low coefficient of sliding and rolling friction at the surface between the device 10 and member 34.

FIG. 5 shows an additional embodiment of the invention in which the plate 36 is cast around the fibrous substrate 12. This cast plate 36 may be any material such as a metal, metal alloy or plastic, which may be cast in place without destroying the fibrous substrate 12. After casting, the substrate is impregnated with lubricating medium 14 to form the completed anti-friction device 10.

FIG. 6 shows an additional embodiment of the invention in which the anti-friction device 10 is provided with an additional source of lubricant, solid, protruding lubricant plugs 38. Lubricant plugs 38, which are fabricated by compressing a solid lubricant such as graphite or "Teflon", are pressed into recesses 40 formed in plate 18, so that a portion of the plug projects above the surface of plate 18. Plugs 38 thus serve to anchor the substrate 12 against lateral movement on plate 18 by coaction of substrate 12 with the solid protruding plugs 38, similar to the embodiment of FIG. 3. In addition, lubricant plugs 38 provide a back-up source of lubricant between plates 16 and 18, should substrate 12 wear or fail in some other manner.

Thus, several embodiments of an anti-friction device have been described which will allow relative movement between two members, which are capable of withstanding sustained impact loads, and which will withstand a hostile environment.

We claim:

1. An anti-friction device adapted to be disposed between two load bearing members comprising;
   a fibrous, non-metallic substrate, fabricated from a material capable of withstanding hostile conditions,
   a lubricating medium carried by and permeating substantially throughout said entire fibrous substrate whereby when said device is disposed between two members said members are adapted to move relative to one another thereby relieving stresses induced in said members.

2. The anti-friction device of claim 1 wherein said substrate is fabricated from a material which absorbs said lubricating medium, thereby entrapping said lubricating medium entrapping said substrate.

3. The anti-friction device of claim 1 wherein said fibrous substrate is fabricated from a material adapted to withstand temperatures greater than 425°F.

4. The anti-friction device of claim 1 wherein said fibrous substrate is fabricated from a material adapted to withstand high levels of nuclear radiation.

5. The anti-friction device of claim 1 wherein said fibrous substrate is fabricated from a material adapted to withstand sustained impact loads.

6. The anti-friction device of claim 1 wherein said fibrous substrate is a woven material forming a mat.

7. The anti-friction device of claim 1 wherein said fibrous substrate is fabricated from an organic polymeric material comprised of an aramid.

8. The anti-friction device of claim 1 wherein said fibrous substrate is fabricated from an organic polymeric material comprised of an aromatic polyamide.

9. The anti-friction device of claim 1 wherein said fibrous substrate is fabricated from an organic polymeric material comprised of "KEVLAR".

10. The anti-friction device of claim 1 wherein said fibrous substrate is fabricated from an organic polymeric material comprised of "KEVLAR" 29 DP-01.

11. The anti-friction device of claim 1 wherein said lubricating medium is a solid suspension.

12. The anti-friction device of claim 1 wherein said lubricating medium is a liquid.

13. The anti-friction device of claim 1 wherein said lubricating medium is comprised of a material selected from the group consisting of graphite, silicon, greases, "Teflon" and molybdenum disulfide.

14. The anti-friction device of claim 1 wherein said fibrous substrate is fabricated from an organic polymeric material comprised of "KEVLAR" 29 DP-01 and said lubricating medium is comprised of a material selected from the group consisting of graphite, silicon, greases, "Teflon" and molybdenum disulfide.

15. The device of claim 1 wherein one of said members is a plate and said fibrous substrate is adapted to be rigidly connected to said plate.

16. The device of claim 15 wherein said plate has raised portions provided with raised areas and lower portions provided with lower areas adjacent said raised areas whereby when a load is applied to said device by said second member, said substrate will be anchored against lateral movement on said plate by coaction of said raised portions and those parts of said substrate that are below the level of said raised areas.

17. The device of claim 15 wherein said rigid connection is by means of an adhesive.

18. The device of claim 17 wherein said adhesive is an epoxy resin.

19. The device of claim 15 wherein one of said members is cast around one surface of said substrate.

20. The device of claim 15 wherein said plate has a plurality of recesses for the receipt of a plurality of solid plugs of lubricating material, said plugs being dimensioned to protrude above the surface of said plate whereby when a load is applied to said device by said second member, said substrate will be anchored against lateral movement on said plate by coaction of said substrate and said plugs, and whereby said device is provided with a source of lubricant in addition to the lubricating medium carried by said substrate.

* * * * *